(12) United States Patent
Park et al.

(10) Patent No.: US 9,345,045 B2
(45) Date of Patent: May 17, 2016

(54) METHODS AND ARRANGEMENTS FOR ADAPTIVE DELAY CONTROL

(71) Applicant: Intel Corporation, Santa Clara, CA (US)

(72) Inventors: Minyoung Park, Portland, OR (US); Adrian P. Stephens, Cambridge (GB); Thomas A. Tetzlaff, Hillsboro, OR (US); Emily H. Qi, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/730,990

(22) Filed: Dec. 29, 2012

(65) Prior Publication Data
US 2014/0185535 A1 Jul. 3, 2014

Related U.S. Application Data

(60) Provisional application No. 61/637,605, filed on Apr. 24, 2012.

(51) Int. Cl.
*H04W 4/00* (2009.01)
*H04W 74/04* (2009.01)
*H04W 56/00* (2009.01)

(52) U.S. Cl.
CPC .......... *H04W 74/04* (2013.01); *H04W 56/0005* (2013.01)

(58) Field of Classification Search
CPC ...................................... H04W 74/04
USPC ......................................... 370/329
See application file for complete search history.

(56) References Cited

U.S. PATENT DOCUMENTS

| 2009/0257369 | A1* | 10/2009 | Igarashi et al. | 370/311 |
| 2012/0230370 | A1* | 9/2012 | Shaffer et al. | 375/133 |
| 2012/0236789 | A1* | 9/2012 | Dravida et al. | 370/328 |
| 2013/0022083 | A1* | 1/2013 | Vasseur et al. | 375/132 |

* cited by examiner

*Primary Examiner* — Wei Zhao
(74) *Attorney, Agent, or Firm* — Schubert Law Group PLLC

(57) ABSTRACT

Logic may comprise hardware and/or code to coordinate communications of wireless communications devices. Logic coordinate communications in an access point by implementing adaptive delays. Logic may determine a delay for stations awaking from a doze state during which the station should perform clear channel assessment prior to transmitting packets on a channel. Logic may collect information about devices and/or communications within a basic service set (BSS) such as the statistics of the received packets length in time, the type of stations in the network, and/or other information available. Based upon the information collected, the logic may determine a delay and transmit the delay to devices in the BSS. Logic may receive and update the delay in memory and then implement the delay after switching to an awake state from a doze state.

28 Claims, 6 Drawing Sheets

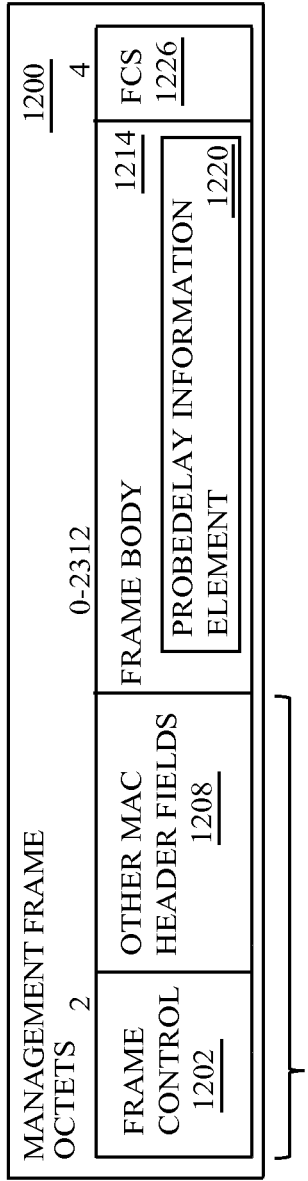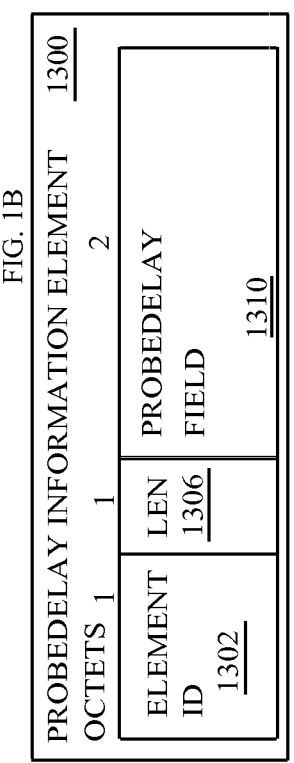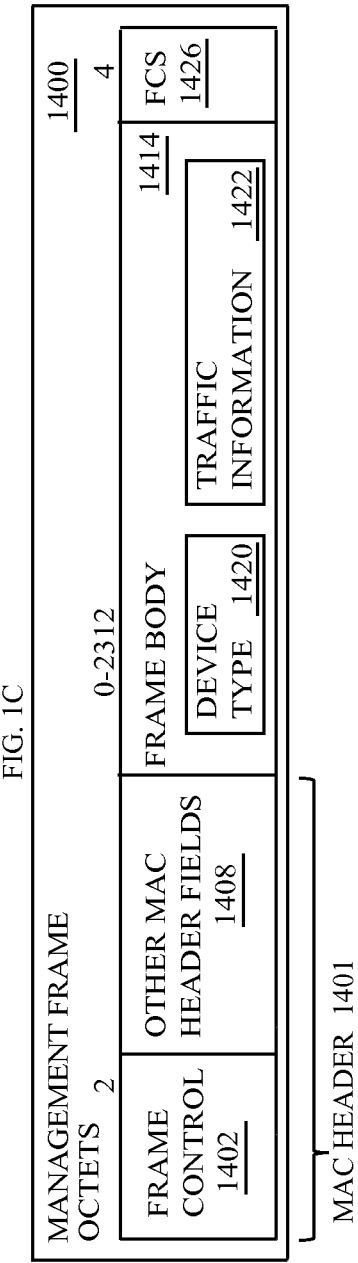

METHODS AND ARRANGEMENTS FOR ADAPTIVE DELAY CONTROL

BACKGROUND

The present disclosure relates generally to the field of wireless communications technologies. More particularly, the present disclosure relates to adaptively determine and set a delay or wait time for devices on a wireless network for performing clear channel assessment upon awakening from a doze state.

BRIEF DESCRIPTION OF THE DRAWINGS

FIG. 1A depicts an embodiment of a management frame with ProbeDelay information element for establishing communications between wireless communication devices;

FIG. 1B depicts an embodiment of a ProbeDelay information element for establishing communications between wireless communication devices;

FIG. 1C depicts an embodiment of a management frame with information for determining a ProbeDelay or an updated ProbeDelay;

DETAILED DESCRIPTION OF EMBODIMENTS

Figure 1:
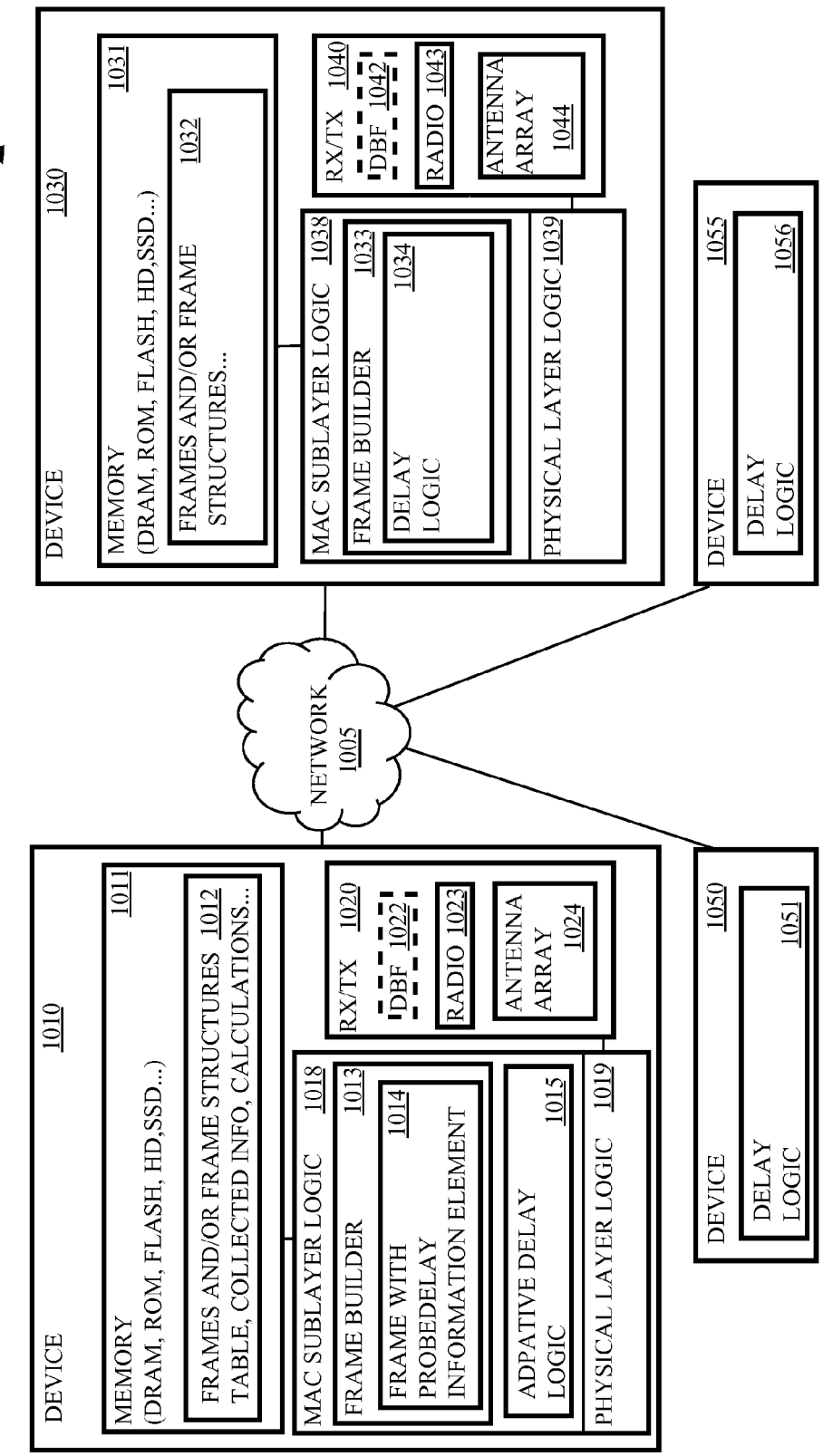
FIG. 1 depicts an embodiment of a wireless network comprising a plurality of communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

Generally, embodiments for coordinating communications of devices on a network are described herein. Embodiments may comprise logic such as hardware and/or code to coordinate communications of wireless communications devices such as high power wireless communications devices and low power wireless communications devices. Many embodiments coordinate communications by implementing adaptive delay logic in an access point. The adaptive delay logic may determine a delay for stations awaking from a doze state during which the station should perform clear channel assessment prior to transmitting packets on a channel.

The adaptive delay logic may collect information about devices and/or communications within a basic service set (BSS) associated with the access point (AP). In some embodiments, for instance, the adaptive delay logic may collect the statistics of the received packets length in time, the type of stations in the network (sensor type devices, cellular offloading devices, or mix of both types), and/or other information available to the AP. Based upon the information collected, the adaptive delay logic may determine a delay such as a ProbeDelay value. For example, if all the associated stations in the BSS are "sensor type/class", which have very low duty-cycles, the adaptive delay logic may set the ProbeDelay value to smaller value. If there are mix of "sensor type" and "cellular offloading type" in the network, the adaptive delay logic may use a larger ProbeDelay value based on the traffic information provided by the "cellular offloading type" devices.

In many embodiments, the delay may be between a minimum delay and a maximum delay. In some embodiments, the delay may be calculated with an algorithm or selected from a table of delays based upon the information collected. In some embodiments, the adaptive delay logic may adjust delay times, the calculations of the delay times, and/or the delay times in a table based upon heuristic data related to communications such as collisions that may be attributable to a hidden node problem.

The hidden node problem may be particularly prevalent in systems such as IEEE 802.11ah systems in which different types of devices may share the same channel and also a relatively large number of devices can be supported in a BSS. Sub one GigaHertz (GHz) channel measurements in an outdoor environment show that the path loss between stations (STAs), which are mostly on the ground level, is much higher than the path loss between STAs and an AP, where the AP is on top of a building (or a pole). This is mainly due to obstructions (buildings or other structures) between the STAs. This asymmetric channel characteristic between STA-STA and STA-AP communications together with the increased transmission range and the increased number of stations in the network increase a chance of the hidden node problem because STAs that may be able to detect the AP transmissions, may not be able to detect another STA communicating with the AP. The STAs at the edge of the coverage area (cell) are prone to this hidden node problem when their transmissions overlap.

The problem becomes worse for embodiments in which STAs may comprise a Power Saving (PS) mode that causes the STAs to switch their operation states between Awake states and Doze states frequently. The STAs minimize their Awake state, minimizing the chance that they would detect the signals of other STAs. As a result, many embodiments require that a STA that is changing from a Doze state to an Awake state, in order to transmit, shall perform clear channel assessment (CCA) until a frame sequence is detected by which the STA can correctly set its network allocation vector (NAV), or until a period of time equal to a ProbeDelay has transpired.

A maximum delay may be a maximum time period for physical layer (PHY) convergence procedure protocol data unit (PPDU) transmission plus a short interframe space (SIFS) plus a CCA detection time. However, if the delay is too long (e.g. Max PPDU length+SIFS+CCA detection time), a STA may unnecessarily and repeatedly consume additional power synchronizing to the activities in the channel, which reduces the STA's battery life. Utilizing the maximum delay may be too conservative in many situations and in the worst case, the STA may end up waiting for the delay duration to find that the channel is most often idle.

A minimum delay may be no delay so the station may awake from a doze state, perform a CCA and begin to transmit rather than continue to perform a CCA for an extended period of time. If the delay is too short, the STA may cause collision if there is a transmission from a hidden node to the STA. However, if there is no transmission from the hidden node, the STA can save power by not waiting too long. The gain can be the maximum delay minus the minimum delay when the channel is more often idle than busy.

After the adaptive delay logic determines a delay, the AP with the adaptive delay logic may transmit the delay information to the devices in the BSS. In many embodiments, the delay information may be transmitted in a management frame. For instance, when a device requests association with an AP, the AP may transmit an association response or reassociation response frame to the device including the delay. In further embodiments, the AP may transmit the delay information in a beacon frame periodically. For example, the delay may be included in a ProbeDelay information element in the frame body of the management frame.

The device that receives the management frame with the delay information may parse the frame to locate the delay information and parse the delay information to determine a value for the delay. After determining a value for the delay, the device may update a previously stored or default value for the delay. For example, the device may receive the ProbeDelay information element in a beacon frame from the AP. In response, the device may parse the beacon frame to locate the ProbeDelay information element and parse the ProbeDelay information element to determine the value for the delay. After determining the value for the delay, the device may update the ProbeDelay value previously stored in memory of the device.

Various embodiments may be designed to address different technical problems associated with coordinating communications of devices. For instance, some embodiments may be designed to address one or more technical problems such as delaying the transmission of a low power, sensor type device to increase the opportunity for the device to detect a NAV while performing CCA. The technical problem of delaying the transmission of a low power, sensor type device to increase the opportunity for the device to detect a NAV while performing CCA may involve updating or setting a ProbeDelay for devices in a BSS.

Different technical problems such as those discussed above may be addressed by one or more different embodiments. For instance, some embodiments that are designed to address delaying the transmission of a low power, sensor type device to increase the opportunity for the device to detect a NAV while performing CCA may do so by one or more different technical means such as collecting information about the length in time of received packets in the BSS. Further embodiments that are designed to determine a delay may do so by one or more different technical means such as collecting information about types of devices in the BSS and traffic information about the types of devices. In further embodiments, the adaptive delay logic may establish a delay based upon other available information.

Some embodiments implement a 1 Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. In many embodiments, the lowest PHY rate is used for beacon and control frame transmissions. Although lowering the data rate may increase the transmission range, it takes much longer time to transmit a packet. According to one embodiment, the efficiency of the protocol may enable small battery-powered wireless devices (e.g., sensors) to use Wi-Fi to connect to the, e.g., Internet with very low power consumption.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs) for and/or client devices of APs or other stations (STAs) such as cellular off-loading devices, routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications devices 1030 and 1050 may comprise low power communications devices such as sensors, consumer electronics devices, personal mobile devices, or the like. And communications device 1055 may comprise a high power device for cellular offloading and may comprise a station such as an access points, hub, switch, repeater, router, computer, or other wireless-capable device. For example, the communications device 1010 may comprise a metering substation for water consumption within a neighborhood of homes. Each of the homes within the neighborhood may comprise a sensor such as the communications devices 1030 and 1050 and the communications devices 1030 and 1050 may be integrated with or coupled to water meter usage meters.

In some embodiments, the communications device 1010 may comprise adaptive delay logic 1015 to collect information related to devices that are associated with the communications device 1010 or that request association with the communications device 1010. The information may comprise information about the lengths of time during which the communications devices 1030, 1050, and 1055 transmit packets to the communications device 1010 such as average and/or maximum frame transmission times; the types or classes of devices associated with the communications device 1010 such as the sensor type devices, cellular offloading devices, or mix of both types; the duty cycles of the devices 1030, 1050, and 1055; the traffic patterns of communications from the devices, and/or other information associated with communications traffic of the devices.

In many embodiments, the adaptive delay logic 1015 may store the collected information in memory 1011. In some embodiments, the adaptive delay logic 1015 may store averages of information such as average or mean lengths of data transmissions for each device, each device type or class, or for all devices associated with the communications device 1010. In further embodiments, the adaptive delay logic 1015 may store minimum and maximum lengths of data transmissions or just maximum lengths. In several embodiments, the types of information collected may depend on the device types or classes of the devices and/or the mix of devices associated with the communications device 1010. For instance, different information may be collected about cellular offloading devices than from sensor type devices. And, in many embodiments, the adaptive delay logic 1015 may continue to update the information based upon changes detected in the basic service set.

The adaptive delay logic 1015 may estimate a delay value such as a ProbeDelay value based on the collected information. For instance, the adaptive delay logic 1015 may estimate a ProbeDelay value based on (1) the statistics of the received packets length in time or (2) the type of stations in the network (sensor type devices, cellular offloading devices, or mix of both types) or (3) other information available. To illustrate, in one embodiment, the adaptive delay logic 1015 may estimate a ProbeDelay value based on the average received packets length in time. In a further embodiment, the adaptive delay logic 1015 may estimate a ProbeDelay value based on the average received packets length in time plus the SIFS plus the CCA detection time.

In some embodiments, the adaptive delay logic 1015 may comprise heuristic logic to adjust an estimation based upon other traffic information such as the occurrence of collisions. For instance, some embodiments may set the ProbeDelay value closer to the maximum value and decrease the value just above a value heuristically determined to be associated with collisions. In further embodiments, the adaptive delay logic 1015 may estimate the ProbeDelay value low, i.e., closer to the minimum and increase the values in response to collisions or perceived collisions.

After determining the value of the delay or an updated value for the delay, the adaptive delay logic 1015 may inform devices that are associated with the communications device 1010 of the delay value. In some embodiments, the communications device 1010 may transmit the delay value or an indication of the delay value in a management frame. For example, as devices associate or reassociate with the communications device 1010, the communications device 1010 may include the delay value in the association or reassociation response frame as, e.g., a ProbeDelay information element. For devices that are already associated with the communications device 1010 and other devices that may receive beacons from the communications device 1010, the communications device 1010 may transmit the delay in a beacon frame as, e.g., a ProbeDelay information element.

For example, the communications device 1055 may receive a beacon frame from the communications device 1010. In response, the communications device 1055 may transmit an association request to the communications device 1010 and the communications device 1010 may transmit an association response to the communications device 1055 that includes a ProbeDelay information element in the frame body of a medium access control (MAC) sublayer frame. The delay logic 1034 of the communications device 1030 may receive, parse, and determine the ProbeDelay value from the ProbeDelay information element and store the ProbeDelay value in the memory 1031. In further embodiments, the communications device 1010 may transmit a beacon to the communications devices 1030, 1050, and 1055 that includes a ProbeDelay information element in the frame body of a MAC sublayer frame. The ProbeDelay information element may comprise the delay or an indication of the delay. In response, the delay logic 1034, 1051, and 1056 of the communications devices 1030, 1050, and 1055 may receive, parse, and determine the ProbeDelay value from the ProbeDelay information element and store the ProbeDelay value in memory such as the memory 1031 of the communications device 1030.

In many embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and MAC sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames such as the management frames, ProbeDelay information elements, and/or the frame structures, and the memory 1011 may store actual, estimated and/or updated information collected about associated devices, one or more tables of delay default and/or updated values indexed via information to be collected, calculations to determine a delay value based upon the collected information, default and/or updated values for the ProbeDelay, and/or the like.

In many embodiments, the management frames such as beacon frames, association request frames, and association response frames may comprise fields based upon the structure of the standard frame structures identified in IEEE 802.11.

FIG. 1A depicts an embodiment of a management frame 1200 for communications between wireless communication devices such as communications devices 1010, 1030, 1050, and 1055 in FIG. 1. The management frame 1200 may comprise a MAC header 1201, a frame body 1214, and a frame check sequence (FCS) field 1226. The MAC header 1201 may comprise the frame control field 1202 and other MAC header fields 1208. The frame control field 1202 may be two octets and may identify the type and subtype of the frame such as a management type and, e.g., a beacon frame subtype. The other MAC header fields 1208 may comprise, for example, one or more address fields, identification fields, control fields, or the like.

In some embodiments, the management frame 1200 may comprise a frame body 1214. The frame body 1214 may be a variable number of octets and may include data elements, control elements, or parameters and capabilities. In the present embodiment, the frame body 1214 comprises a ProbeDelay information element 1220. The ProbeDelay information element 1220 may comprise a delay that a device has to wait and sense the channel before accessing the channel to be synchronized to the channel.

FIG. 1B illustrates an embodiment of a ProbeDelay information element 1300 such as the ProbeDelay information element 1220. The ProbeDelay information element 1300 may comprise fields such as an element identifier (ID) field 1302, a length field 1306, and a ProbeDelay field 1314. The element ID field 1302 may be one octet and may identify the element as a ProbeDelay information element 1300. The length field 1306 may be one octet and may define the length of the ProbeDelay information element 1300 or the length of a portion thereof. The ProbeDelay field 1314 may be, e.g., two octets in microseconds unit (0-65 mS) and may indicate a time duration for a delay that a device changing from a doze state to an awake state should sense the channel if no frame sequence with a NAV is detected or can be set.

FIG. 1C depicts an embodiment of a management frame 1400 for communications between wireless communication devices such as communications devices 1010, 1030, 1050, and 1055 in FIG. 1. The management frame 1400 may comprise a MAC header 1401, a frame body 1414, and a frame check sequence (FCS) field 1426. The MAC header 1401 may comprise the frame control field 1402 and other MAC header fields 1408. The frame control field 1402 may be two octets and may identify the type and subtype of the frame such as a management type and, e.g., an association request frame subtype. The other MAC header fields 1408 may comprise, for example, one or more address fields, identification fields, control fields, or the like.

In some embodiments, the management frame 1400 may comprise a frame body 1414. The frame body 1414 may be a variable number of octets and may include data elements, control elements, or parameters and capabilities. In the present embodiment, the frame body 1414 comprises a device type field 1420 and a traffic information field 1422. The device type field 1420 may be part of, e.g., an information element and may indicate a device type of a device that is requesting association with an AP. The traffic information field 1420 may be part of, e.g., an information element and may indicate a anticipated or scheduled traffic, periodicity of anticipated or scheduled traffic, capabilities for handling traffic, and/or the like of a device that is requesting association with an AP. The AP may utilize information from the device type field 1420 and the traffic information field 1422 to determine a delay value and/or to update the delay value.

Figure 1D:
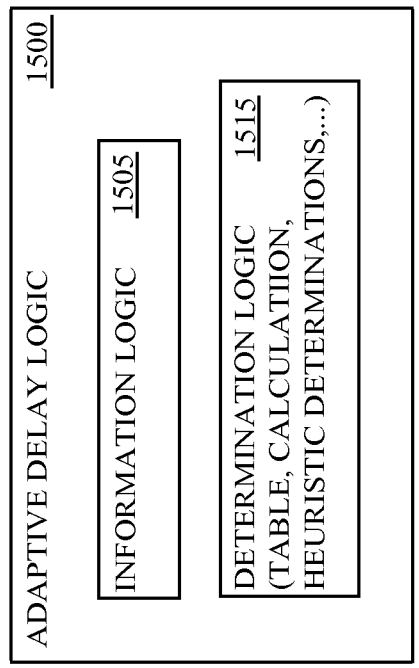
FIG. 1D depicts an embodiment of adaptive delay logic for the system illustrated in FIG. 1.

FIG. 1D illustrates an embodiment of adaptive delay logic 1500 such as the adaptive delay logic 1015 illustrated in FIG. 1. The adaptive delay logic 1500 may adaptively change the value of a delay associated with devices that wake from a doze state to an awake state before the device can access a channel unless the device receives and sets a NAV from a frame sequence prior to the expiration of the delay. In many embodiments, the delay is a ProbeDelay and the adaptive delay logic 1500 may reside in an AP that can gather information about devices within a BSS of the AP to determine the ProbeDelay.

The adaptive delay logic 1500 may comprise information logic 1505 to collect information about transmissions of devices or about the devices such as the communications devices 1030, 1050, and 1055. For instance, the information logic 1505 may collect information received during a process of granting an association with a device in the BSS. In some embodiments, the information logic 1505 may request information from the devices during the association process and, in some embodiments, the information logic 1505 may request information from devices after association either for the first time or to gather updated information. For instance, the information logic 1505 may request device type information, device class information, device traffic information, and/or the like. In several embodiments, the information logic 1505 may request, receive, and collect a sensor type and/or class, a duty cycle type (e.g. low), other duty cycle information, a cellular offloading type and/or class, other traffic information, and/or the like. In many embodiments, the information may be collected and stored in memory such as memory 1011 in FIG. 1.

In further embodiments, the information logic 1505 may collect information related to the length of transmissions of devices in the BSS. In some embodiments, the information logic 1505 may collect information about the lengths of all detectable transmissions such as detectable transmissions that might cause collisions with devices in the BSS.

The adaptive delay logic 1500 may also comprise determination logic 1515 to determine a delay value such as a ProbeDelay value or an updated ProbeDelay value based upon the information collected about transmissions of devices or about the devices such as the communications devices 1030, 1050, and 1055. In some embodiments, the determination logic 1515 may perform one or more calculations to determine a delay value, look-up one or more values in one or more tables based upon the collected information to determine a delay value, determine the delay based upon progression or patterns in historical information collected about transmissions by devices, and/or perform heuristic determinations based upon the information collected such as delay values that might be associated with collisions.

After the adaptive delay logic 1500 determines a delay value or an updated delay value, the adaptive delay logic 1500 may transmit the delay value or the update delay value such as a ProbeDelay value in a management frame such as a beacon to communicate the delay value or updated delay value to devices within the BSS.

Figure 1E:
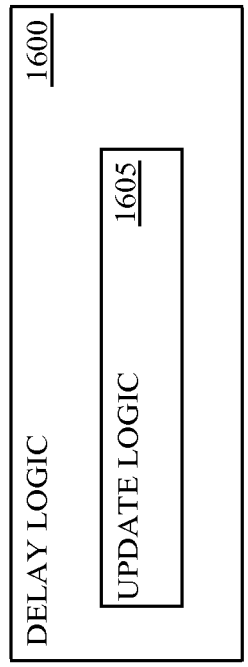
FIG. 1E depicts an embodiment of delay and update logic for the system illustrated in FIG. 1.

FIG. 1E illustrates an embodiment of delay logic 1600 such as the delay logic 1034 illustrated in FIG. 1. The delay logic 1600 may provide information such as device type/class, traffic information, duty cycle information, and/or the like during an association process and/or in response to a request for the same from an AP. The delay logic 1600 may also comprise update logic 1605 to receive and parse a frame with the delay information such as a management frame with a ProbeDelay information element to determine a delay value. In response to receiving the delay value, the update logic 1605 may store or update the delay value in memory. For example, in response to receiving a beacon with a ProbeDelay information element, the update logic 1605 may parse the Probe-Delay information element to determine a ProbeDelay value and store or update the ProbeDelay value in memory such as memory 1031.

Referring again to FIG. 1, the MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1019, 1039 to transmit the frames 1014. The PHY logic 1019, 1039 may generate physical layer protocol data units (PPDUs) based upon the frames like frame 1014 1014. More specifically, the frame builders 1013 and 1033 may generate the frames and data unit builders of the PHY logic 1019, 1039 may encapsulate the frames with preambles to generate PPDUs for transmission via a physical layer device such as the transceivers (RX/TX) 1020 and 1040.

The frame 1014, also referred to as a MAC layer Service Data Unit (MSDU), may comprise a management frame. For example, frame builder 1013 may generate a management frame such as the beacon frame to identify the communications device 1010 as having capabilities such as supported data rates, privacy settings, quality of service support (QoS), power saving features, cross-support, and a service set identification (SSID) of the network to identify the network to the communications device 1030. In some embodiments, every beacon frame may comprise a ProbeDelay information element such as the ProbeDelay information element 1300 in FIG. 1B and the ProbeDelay information element may comprise the current ProbeDelay value. In further embodiments, selected beacon frames may comprise ProbeDelay information elements with the current ProbeDelay value. For example, the MAC sublayer logic 1018 may only include the ProbeDelay value in a determined number of beacon frames after the ProbeDelay value changes as a result of updated information or heuristic determinations.

The communications devices 1010, 1030, 1050, and 1055 may each comprise a transceiver such as transceivers 1020 and 1040. Each transceiver 1020, 1040 comprises a radio 1023, 1043 comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. A guard interval may be inserted between symbols such as the short training field (STF) and long training field (LTF) symbols during transmission to avoid inter-symbol interference (ISI), which might result from multi-path distortion. Guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied via the radio 1023, 1043 to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 2:
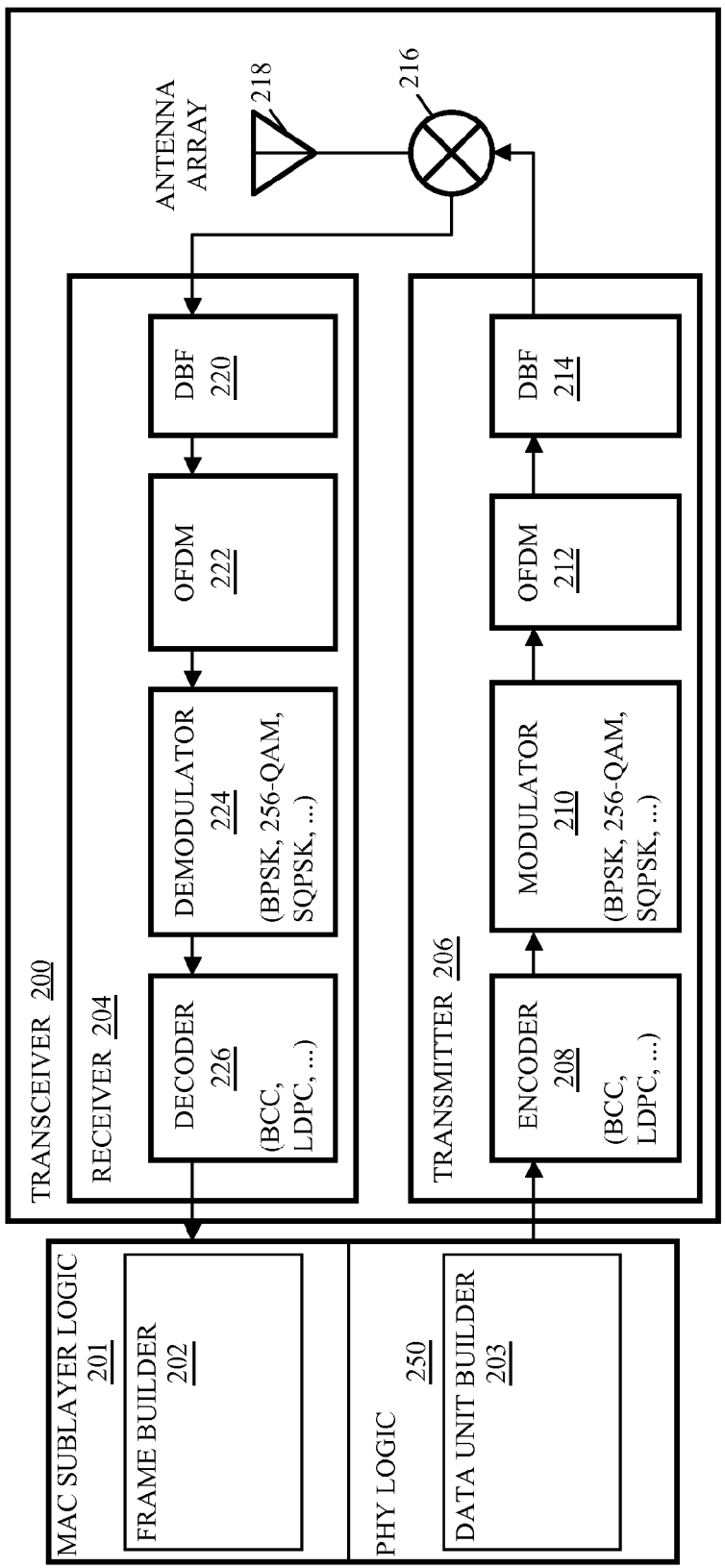
FIG. 2 depicts an embodiment of an apparatus to coordinate communications.

FIG. 2 depicts an embodiment of an apparatus to generate, communicate, transmit, receive, communicate, and interpret a frame. The apparatus comprises a transceiver 200 coupled with medium access control (MAC) sublayer logic 201. The MAC sublayer logic 201 may determine a frame such as a management frame and transmit the frame to the physical layer (PHY) logic 250. The PHY logic 250 may determine the physical layer convergence procedure protocol data unit (PPDU) by determining a preamble and encapsulating the frame with a preamble to transmit via transceiver 200.

In many embodiments, the MAC sublayer logic 201 may comprise a frame builder 202 to generate frames, or MAC protocol data units (MPDUs). The MAC sublayer logic 201 may then receive and parse and interpret a response frame. In many embodiments, the MAC sublayer logic 201 may comprise logic to estimate a ProbeDelay value for the associated stations in the network based on the statistics of the received packets length in time, the type of stations in the network (sensor type devices, cellular offloading devices, or mix of both types), or other information available. The MAC sublayer logic 201 may then generate a management frame such as a beacon frame with the ProbeDelay value and instruct the PHY logic 250 to transmit the management frame.

In other embodiments, the MAC sublayer logic 201 may comprise logic to receive and update a ProbeDelay value from an AP in a management frame or transmit to the AP the type of station (sensor type device, cellular offloading device, or other type of device), or other information.

The PHY logic 250 may comprise a data unit builder 203. The data unit builder 203 may determine a preamble and the PHY logic 250 may encapsulate the MPDU with the preamble to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal subcarriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

After receiving a frame, the MAC sublayer logic 201 may access frame structures in memory to parse the frame. Based upon this information, the MAC sublayer logic 201 may determine contents such as field values in the frame such as values in a ProbeDelay field, a device type field, and/or a traffic information field.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing. In some embodiments, for instance, the transceiver 200 may comprise one or more processors and memory including code to perform functions of the transmitter 206 and/or receiver 204.

Figure 3:
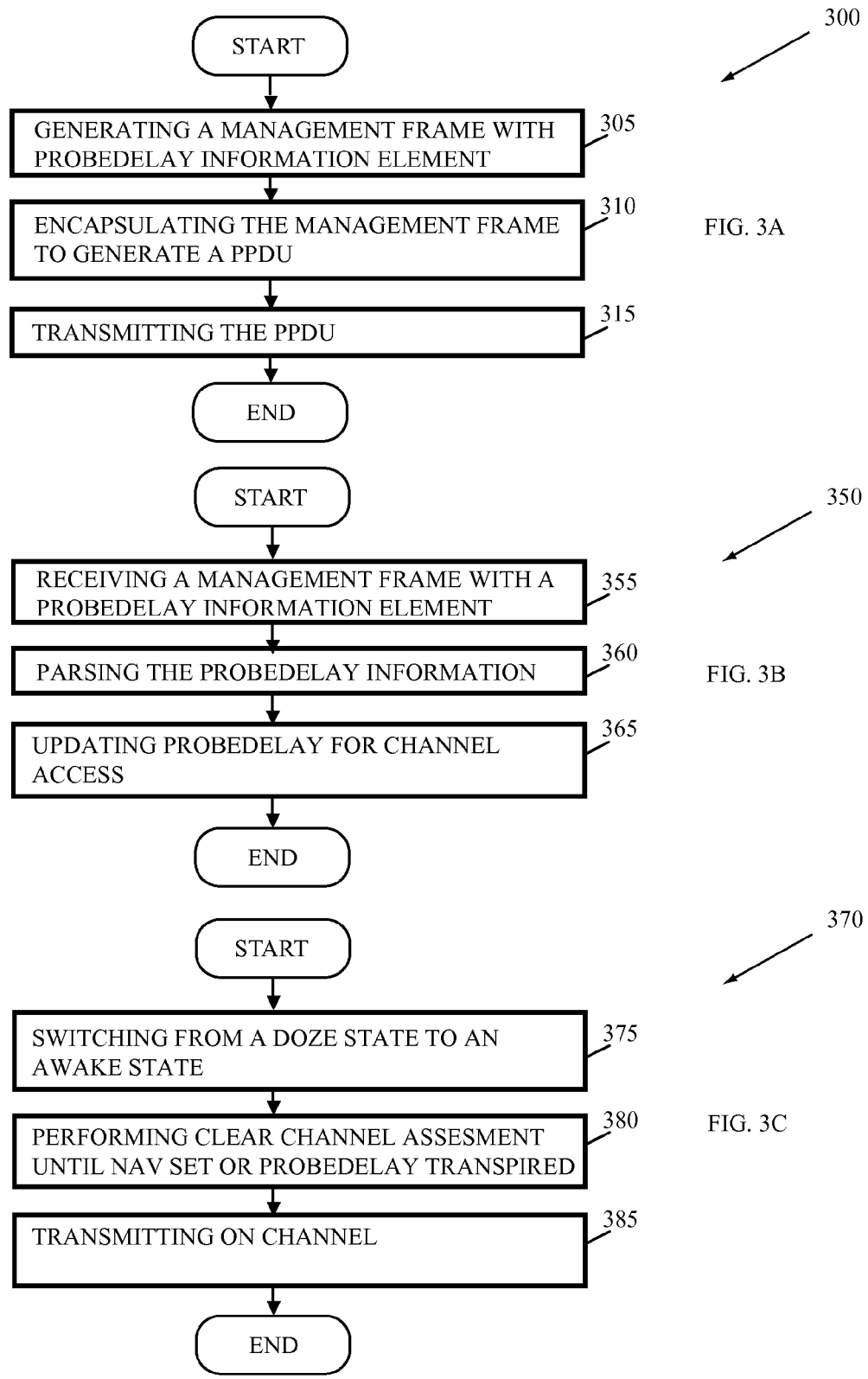
FIG. 3A-C depict embodiments of flowcharts to coordinate communications.

FIGS. 3A-C depict embodiments of flowcharts 300, 350, and 370 to coordinate communications. Referring to FIG. 3A, the flowchart 300 begins with generating a management frame with a ProbeDelay information element (element 305). In some embodiments, MAC logic such as MAC sublayer logic in an AP may generate a management frame such as a beacon frame to communicate a delay value such as a ProbeDelay value. The management frame may comprise an association frame such as an association response frame, a beacon frame, or another management frame. In other embodiments, a station may transmit a communication to an AP with a management frame that comprises information such as a device type or class or other information that may help to determine a ProbeDelay.

After generating the management frame, the PHY logic may encapsulate the management frame with a preamble to generate a PPDU (element 310). And the PHY may then transmit the PPDU via an antenna or an antenna array (element 315).

In FIG. 3B, the flowchart 350 begins with receiving a management frame with a ProbeDelay information element (element 355). In some embodiments, MAC logic of a station may receive the management frame with the ProbeDelay information element and parse and interpret the management frame to determine the ProbeDelay value (element 360). In several embodiments, parsing the frame to determine the delay comprises parsing a management frame with a ProbeDelay information element and parsing the ProbeDelay information element comprises parsing the ProbeDelay field to determine the delay. In some embodiments, parsing the management frame comprises parsing a beacon frame, an association response frame, or a reassociation response frame.

In many embodiments, the station may, in response to receiving a ProbeDelay information element in a management frame, update a ProbeDelay for the channel access (element 365). For instance, the upon parsing the ProbeDelay information element to determine a ProbeDelay value, the station may store the ProbeDelay value in memory, overwriting the prior ProbeDelay value or storing the ProbeDelay value in a location of memory associated with an updated value of the ProbeDelay.

In FIG. 3C, the flowchart 370 begins with switching from a doze state to an awake state (element 375). In some embodiments, MAC logic of a station may wake periodically to transmit data to the access point. The station may wake from the doze state, which may be a low power consumption state, to an awake state to facilitate communication with the access point.

Upon entering the awake state and before transmitting the data, the station may perform clear channel assessment until a network allocation vector is successfully detected and set, or until the ProbeDelay transpired (element 380). In many embodiments, performing a clear channel assessment involves deferring transmissions after switching from a doze state to an awake state. Stations may defer transmissions to perform clear channel assessment for the delay absent detection of a frame sequence with a network allocation vector that results in setting the network allocation vector for the station before the expiration of the delay.

After the clear channel assessment detects a frame sequence and sets a NAV or the delay transpires, the station may transmit a packet on the channel (element 380). For instance, the station may comprise a sensor and may transmit sensor data to the access point.

Figure 4:
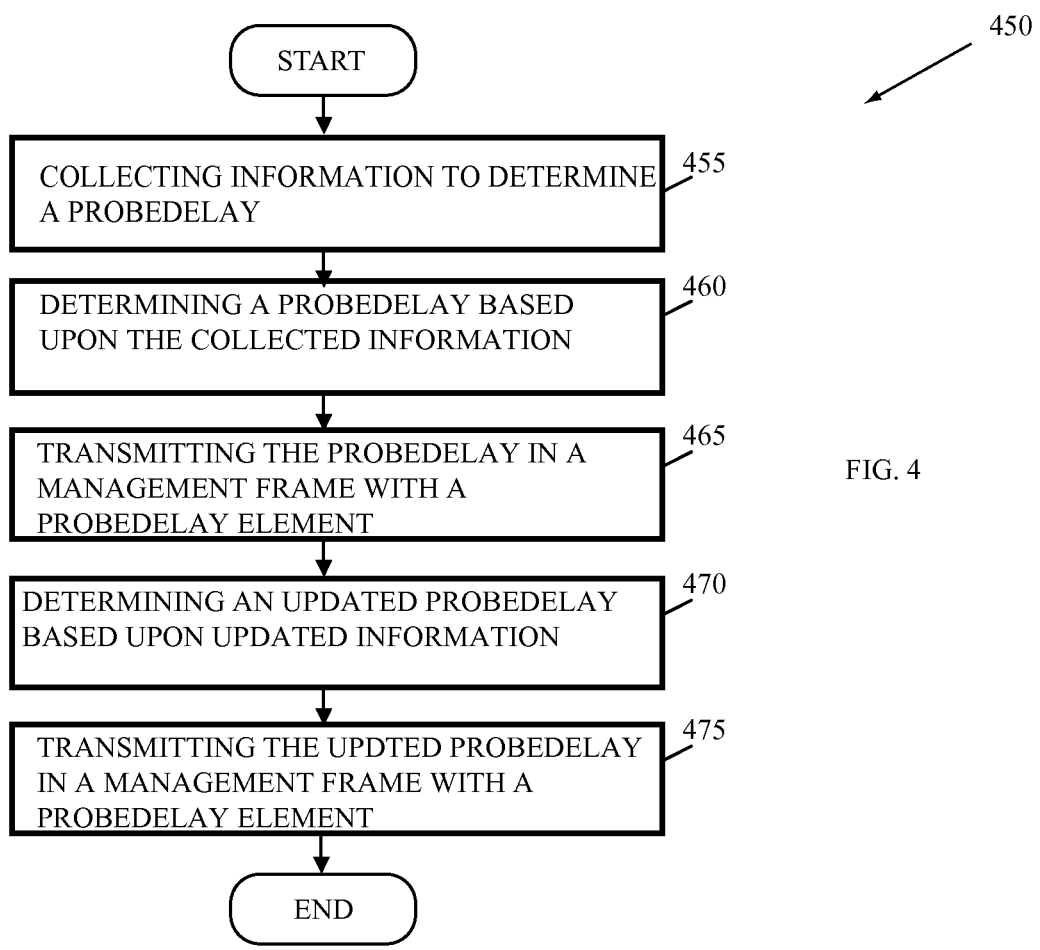
FIG. 4 depicts an embodiment of a flowchart to coordinate communications as illustrated in FIG. 2.

FIG. 4 depicts an embodiment of flowchart 450 to coordinate communications as illustrated in FIG. 2. The flowchart 450 begins with collecting information to determine a ProbeDelay (element 455). Collecting may involve collecting, by a first communications device such as an AP, information associated with devices based on communications between the communication devices and the first communications device. In some embodiments, collecting information associated with devices comprises collecting length information of received packets from the communication devices associated with the first communications device. In further embodiments, collecting information associated with devices comprises collecting types of the communications devices that are associated with the first communications device, wherein the types of the communications devices comprise sensor types, cellular offloading types, and both a sensor type and a cellular offloading type. And, in many embodiments, the collected information may be stored in memory.

After collecting the information about the communications devices associated with the first communications device, the first communications device may determine a delay such as a ProbeDelay based upon the information (element 460). Determining the delay may comprise calculating the delay, looking up the delay in a table, adjusting a prior delay based upon information related to collisions between the communications devices, and/or performing more than one of these methods to determine the delay.

Once the delay is determined, the first communications device may generate a frame indicating a delay to instruct communication devices to defer transmissions after switching from a doze state to an awake state for the delay unless such each device detects a frame sequence with a network allocation vector and sets the network allocation vector before the expiration of the delay. In other words, the first communications device may generate a frame indicating the delay. The frame may instruct other communication devices in the wireless network to defer for the delay. The deference by each of the other communications devices may be triggered in each of the other communications devices by a switch from a doze state to an awake state by each of the other communications devices, absent detection of a frame sequence with a network allocation vector that results in the network allocation vector being set by each of the other communications devices, before an expiration of the delay. In many embodiments, generating the frame management frame with a ProbeDelay information element comprises generating a beacon frame, an association response frame, or a reassociation response frame. Thereafter, the first communications device may transmit the delay in a management frame in, e.g., a ProbeDelay information element (element 465).

The first communications device may continue to collect information after transmitting the delay in the management frame and determine an updated delay such as an updated ProbeDelay based upon the information (element 470). In some embodiments, updating the delay may comprise updating the delay based upon the information collected since the last determination of the delay. In further embodiments, updating the delay may comprise updating the delay based upon information collected both before determining the previous delay and information collected after determining the previous delay. Thereafter, the first communications device may transmit the updated delay in a management frame in, e.g., a ProbeDelay information element (element 465).

The following examples pertain to further embodiments. One example comprises a method. The method may involve generating, by a first communications device, a frame indicating a delay, the frame to instruct other communication devices in the wireless network to defer for the delay, wherein deference by each of the other communications devices is triggered in each of the other communications devices by a switch from a doze state to an awake state by each of the other communications devices, absent detection of a frame sequence with a network allocation vector that results in the network allocation vector being set by each of the other communications devices, before an expiration of the delay; and transmitting, by the first communications device, the frame.

In some embodiments, the method may further comprise collecting, by the first communications device, information associated with devices based on communications between the communication devices and the first communications device; determining, by the first communications device, a delay based upon the information. In some embodiments, collecting, by the first communications device, information associated with devices comprises collecting length information of received packets from the communication devices associated with the first communications device. In many embodiments, collecting, by the first communications device, information associated with devices comprises collecting types of the communications devices that are associated with the first communications device, wherein the types of the communications devices comprise sensor types, cellular offloading types, and both a sensor type and a cellular offloading type. In several embodiments, generating the frame comprises generating a management frame with a ProbeDelay information element, the ProbeDelay information element comprising the delay. In some embodiments, generating the frame management frame with a ProbeDelay information element comprises generating a beacon frame, an association response frame, or a reassociation response frame.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a medium access control logic to generate a frame indicating a delay, the frame to instruct other communication devices in the wireless network to defer for the delay, wherein deference by each of the other communications devices is triggered in each of the other communications devices by a switch from a doze state to an awake state by each of the other communications devices, absent detection of a frame sequence with a network allocation vector that results in the network allocation vector being set by each of the other communications devices, before an expiration of the delay; and a physical layer logic to encapsulate and transmit the frame.

In some embodiments, the apparatus may further comprise an antenna to transmit the frame encapsulated by the preamble. In some embodiments, the medium access control logic comprises logic to collect information associated with devices based on communications between the communication devices and the apparatus and to determine a delay based upon the information. In some embodiments, the medium access control logic comprises logic to collect the length information of received packets from the communication devices associated with the apparatus. In some embodiments, the medium access control logic comprises logic to collect types of the communications devices that are associated with the apparatus, wherein the types of the communications devices comprise sensor types, cellular offloading types, and both a sensor type and a cellular offloading type. And in some embodiments of the apparatus, the medium access control logic comprises logic to generate a management frame with a ProbeDelay information element, the ProbeDelay information element comprising the delay.

Another example comprises a system. The system may comprise a medium access control logic to generate a frame indicating a delay, the frame to instruct other communication devices in the wireless network to defer for the delay, wherein deference by each of the other communications devices is triggered in each of the other communications devices by a switch from a doze state to an awake state by each of the other communications devices, absent detection of a frame sequence with a network allocation vector that results in the network allocation vector being set by each of the other communications devices, before an expiration of the delay; and a physical layer logic to encapsulate and transmit the frame.

Another example comprises a program product. The program product to coordinate transmissions of different types of devices on a wireless network may comprise a storage medium comprising instructions to be executed by a processor-based device, wherein the instructions, when executed by the processor-based device, perform operations, the operations comprising: generating, by a first communications device, a frame indicating a delay, the frame to instruct other communication devices in the wireless network to defer for the delay, wherein deference by each of the other communications devices is triggered in each of the other communications devices by a switch from a doze state to an awake state by each of the other communications devices, absent detection of a frame sequence with a network allocation vector that results in the network allocation vector being set by each of the other communications devices, before an expiration of the delay; and transmitting, by the first communications device, the frame.

Another example comprises a method. The method may involve receiving, by a first communications device, a frame indicating a delay, the frame to instruct other communication devices in the wireless network to defer for the delay, wherein deference by each of the other communications devices is triggered in each of the other communications devices by a switch from a doze state to an awake state by each of the other communications devices, absent detection of a frame sequence with a network allocation vector that results in the network allocation vector being set by each of the other communications devices, before an expiration of the delay; parsing, by the first communications device, the frame to determine the delay; and adjusting, by the first communications device, a ProbeDelay value for channel access based upon the delay.

In some embodiments, the method further comprises deferring transmissions after switching from a doze state to an awake state to perform clear channel assessment for the delay unless a frame sequence with a network allocation vector is detected and the network allocation vector is set for the first communications device before the expiration of the delay. In some embodiments, the method further comprises transmitting a communication after the expiration of the delay. In many embodiments, parsing the frame to determine the delay comprises parsing a management frame with a ProbeDelay information element and parsing the ProbeDelay information element comprising the delay to determine the delay. And in many embodiments, parsing the management frame comprises parsing a beacon frame, an association response frame, or a reassociation response frame.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a medium access control logic to receive a frame indicating a delay to instruct the apparatus to defer for the delay, wherein deference by the apparatus is triggered in the apparatus by a switch from a doze state to an awake state by the apparatus, absent detection of a frame sequence with a network allocation vector that results in the network allocation vector being set for the apparatus before the expiration of the delay; parse the frame to determine the delay; and adjust a ProbeDelay value for channel access based upon the delay; and a physical layer logic to receive the frame.

In some embodiments, the apparatus may further comprise an antenna coupled with the physical layer logic to transmit a communication. In some embodiments, the apparatus may further comprise memory coupled with the medium access control logic, the medium access control logic to store an indication of the delay in the memory. In some embodiments, the medium access control logic comprises logic to defer transmissions after switching from a doze state to an awake state to perform clear channel assessment for the delay unless a frame sequence with a network allocation vector is detected and the network allocation vector is set for apparatus before the expiration of the delay. And in some embodiments, the medium access control logic comprises logic to parse a management frame with a ProbeDelay information element and parse the ProbeDelay information element comprising the delay to determine the delay.

Another example comprises a system. The system may comprise a medium access control logic to receive a frame indicating a delay to instruct the apparatus to defer transmissions after switching from a doze state to an awake state for the delay unless a frame sequence with a network allocation vector is detected and the network allocation vector is set for the apparatus before the expiration of the delay; parse the frame to determine the delay; and adjust a ProbeDelay value for channel access based upon the delay; and a physical layer logic to receive the frame.

Another example comprises a program product. The program product to coordinate transmissions of different types of devices on a wireless network may comprise a storage medium comprising instructions to be executed by a processor-based device, wherein the instructions, when executed by the processor-based device, perform operations, the operations comprising: receiving, by a first communications device, a frame indicating a delay to instruct the first communication device to defer transmissions after switching from a doze state to an awake state for the delay unless a frame sequence with a network allocation vector is detected and the network allocation vector is set for the first communications device before the expiration of the delay; parsing, by the first communications device, the frame to determine the delay; and adjusting, by the first communications device, a ProbeDelay value for channel access based upon the delay.

In some embodiments of the program product, parsing the frame to determine the delay comprises parsing a management frame with a ProbeDelay information element and parsing the ProbeDelay information element comprising the delay to determine the delay. And in some embodiments, parsing the management frame comprises parsing a beacon frame, an association response frame, or a reassociation response frame.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch, e-fuse, or the like. Still further features may be selected by a user after via a selectable preference such as a software preference, an e-fuse, or the like.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, a dipswitch, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method to coordinate transmissions of communication devices on a wireless network, the method comprising:
determining, by a first communications device, a delay, wherein the delay indicates a period of time during which other communications devices associated with the wireless network perform clear channel assessment prior to transmitting and after changing from a doze state to an awake state, wherein the delay indicates the period of time during which each of the other communications devices perform the clear channel assessment absent detection of a frame sequence with a network allocation vector that results in the network allocation vector being set, wherein determination of the delay is based upon information related to communications between the first communications device and the other communications devices;
generating, by the first communications device, a frame comprising the delay; and
transmitting, by the first communications device, the frame.

2. The method of claim 1, further comprising:
collecting, by the first communications device, the information associated with other communications devices.

3. The method of claim 2, wherein collecting, by the first communications device, information associated with devices comprises collecting length information of one or more received packets from the other communication devices.

4. The method of claim 2, wherein collecting comprises collecting information regarding one or more types of the other communications devices, wherein the one or more types comprise a sensor type, a cellular offloading type, or both a sensor type and a cellular offloading type.

5. The method of claim 1, wherein generating the frame comprises generating a management frame in accordance with an Institute of Electrical and Electronic Engineers (IEEE) 802.11 standard comprising a ProbeDelay information element, the ProbeDelay information element comprising the period of time.

6. The method of claim 5, wherein generating the frame management frame with a ProbeDelay information element comprises generating a beacon frame, an association response frame, or a reassociation response frame.

7. An apparatus to coordinate transmissions of communication devices on a wireless network, the apparatus comprising:
a medium access control logic comprising hardware to determine a delay, wherein the delay indicates a period of time during which other communications devices associated with the wireless network perform clear channel assessment prior to transmitting and after changing from a doze state to an awake state, wherein the delay indicates the period of time during which each of the other communications devices perform the clear channel assessment absent detection of a frame sequence with a network allocation vector that results in the network allocation vector being set, wherein determination of the delay is based upon information related to communications between the apparatus and the other communications devices; generate a frame comprising the delay; and
a physical layer logic to create a physical layer convergence procedure protocol data unit (PPDU) with the frame and a preamble and transmit the PPDU.

8. The apparatus of claim 7, further comprising a processor, a memory, a radio, and one or more antennas to transmit the PPDU.

9. The apparatus of claim 7, wherein the medium access control logic comprises logic to collect information associated with the communication devices.

10. The apparatus of claim 9, wherein the medium access control logic comprises logic to collect the information about lengths of received packets from the communication devices associated with the apparatus.

11. The apparatus of claim 9, wherein the medium access control logic comprises logic to collect the information about types of the communications devices that are associated with the apparatus, wherein the types of the communications devices comprise sensor types, cellular offloading types, and both a sensor type and a cellular offloading type.

12. The apparatus of claim 7, wherein the medium access control logic comprises logic to generate a management frame with a ProbeDelay information element, the ProbeDelay information element comprising the delay.

13. A program product to coordinate transmissions of communication devices on a wireless network, the program product comprising:
a non-transitory medium comprising instructions to be executed by a processor-based device, wherein the instructions, when executed by the processor-based device, perform operations, the operations comprising:
determining, by a first communications device, a delay, wherein the delay indicates a period of time during which other communications devices associated with the wireless network perform clear channel assessment prior to transmitting and after changing from a doze state to an awake state, wherein the delay indicates the period of time during which each of the other communications devices perform the clear channel assessment absent detection of a frame sequence with a network allocation vector that results in the network allocation vector being set, wherein determination of the delay is based upon information related to communications between the first communications device and the other communications devices;
generating, by the first communications device, a frame comprising the delay; and
transmitting, by the first communications device, the frame.

14. The program product of claim 13, wherein the operations further comprise:
collecting, by the first communications device, information associated with the communication devices.

15. The program product of claim 14, wherein collecting, by the first communications device, information associated with devices comprises collecting length information of received packets from the communication devices associated with the first communications device.

16. The program product of claim 14, wherein collecting, by the first communications device, information associated with the communication devices comprises collecting types of the communications devices that are associated with the first communications device, wherein the types of the communications devices comprise sensor types, cellular offloading types, and both a sensor type and a cellular offloading type.

17. The program product of claim 13, wherein generating the frame comprises generating a management frame with a ProbeDelay information element, the ProbeDelay information element comprising the delay.

18. A method to coordinate transmissions of devices on a wireless network, the method comprising:
receiving, by a first communications device, a frame comprising a delay, wherein the delay indicates a period of time;
parsing, by the first communications device, the frame to determine the period of time;
storing the period of time; and
performing clear channel assessment, after switching from a doze state to an awake state, until a frame sequence is detected by which the first communications device can set a network allocation vector, or until expiration of the delay.

19. The method of claim 18, further comprising transmitting a communication after the expiration of the delay.

20. The method of claim 18, wherein parsing the frame to determine the delay comprises parsing a management frame with a ProbeDelay information element and parsing the ProbeDelay information element comprising the period of time for the delay to determine the delay.

21. The method of claim 20, wherein parsing the management frame comprises parsing a beacon frame, an association response frame, or a reassociation response frame.

22. An apparatus to coordinate transmissions of devices on a wireless network, the apparatus comprising:
- a medium access control logic coupled with a physical layer device to receive a frame comprising a delay, wherein the delay indicates a period of time; parse the frame to determine the period of time for the delay; store the period of time; and perform clear channel assessment, after switching from a doze state to an awake state, until a frame sequence is detected by which the apparatus can set a network allocation vector, or until expiration of the delay; and
- the physical layer device comprising hardware to receive the frame.

23. The apparatus of claim 22, further comprising a processor, a memory, a radio, and one or more antennas coupled with the physical layer device to transmit a communication.

24. The apparatus of claim 22, further comprising memory coupled with the medium access control logic, the medium access control logic to store an indication of the delay in the memory.

25. The apparatus of claim 22, wherein the medium access control logic comprises logic to parse a management frame with a ProbeDelay information element and parse the ProbeDelay information element comprising the period of time for the delay to determine the delay.

26. A program product to coordinate transmissions of devices on a wireless network, the program product comprising:
- a non-transitory medium comprising instructions to be executed by a processor-based device, wherein the instructions, when executed by the processor-based device, perform operations, the operations comprising:
- receiving, by a first communications device, a frame comprising a delay, wherein the delay indicates a period of time;
- parsing, by the first communications device, the frame to determine the period of time for the delay;
- storing the period of time; and
- performing clear channel assessment, after switching from a doze state to an awake state, until a frame sequence is detected by which the first communications device can set a network allocation vector, or until expiration of the delay.

27. The program product of claim 26, wherein parsing the frame to determine the period of time for the delay comprises parsing a management frame with a ProbeDelay information element and parsing the ProbeDelay information element comprising the period of time for the delay to determine the delay.

28. The program product of claim 27, wherein parsing the management frame comprises parsing a beacon frame, an association response frame, or a reassociation response frame.

* * * * *